United States Patent

Tomiyama et al.

[11] 3,894,070
[45] July 8, 1975

[54] SULFATE ESTERS OF POLYALKOXY ADDUCTS OF ETHYLENEDIAMINE

[75] Inventors: Iwao Tomiyama, Nanjo; Tadayoshi Sakai, Fukui; Shinobu Hashizume, Asuwa; Kanjin Ikeda, Fukui, all of Japan

[73] Assignee: Nikka Chemical Industrial Co., Ltd., Fukui, Japan

[22] Filed: Aug. 8, 1972

[21] Appl. No.: 278,830

[52] U.S. Cl. ............... 260/458; 8/172; 260/501.15; 260/584 B
[51] Int. Cl. .................... C07c 93/04; C07c 141/00
[58] Field of Search .......................... 260/458, 584 B

[56] References Cited
UNITED STATES PATENTS

| | | | |
|---|---|---|---|
| 3,449,432 | 6/1969 | Borstlap et al. | 260/458 |
| 3,763,208 | 10/1973 | Sowerby | 260/458 |
| 3,766,274 | 10/1973 | Anello et al. | 260/458 |

*Primary Examiner*—Bernard Helfin
*Assistant Examiner*—Norman Morgenstern
*Attorney, Agent, or Firm*—Milton J. Wayne

[57] ABSTRACT

A surface active compound, useful for level dyeing hydrophobic synthetic fibers such as polyester fibers with disperse dyes, said surface active compounds having the formula

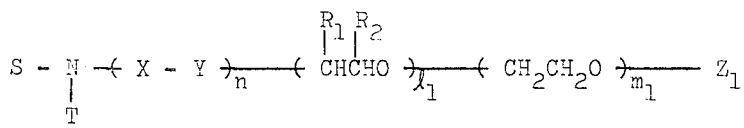

wherein S represents an alkyl group having 1 to 22 carbon atoms,

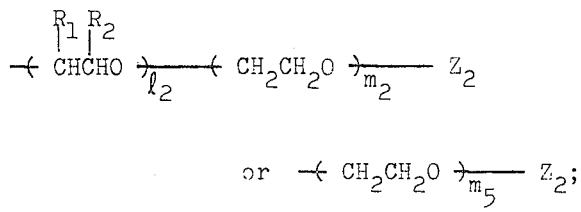

T represents an alkyl group having 1 to 22 carbon atoms,

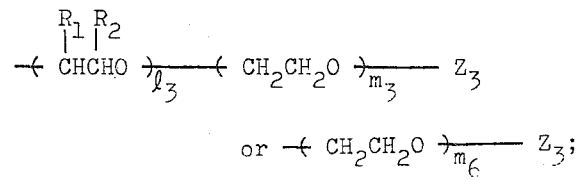

$n$ is an integer of 0 to 4; X represents an alkylene group having 2 to 6 carbon atoms; Y represents —O— or

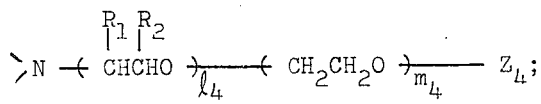

$R_1$ and $R_2$ each represents a hydrogen atom or an alkyl group having 1 to 22 carbon atoms but one of $R_1$ and $R_2$ should be the alkyl group if the other is the hydrogen atom; $Z_1$, $Z_2$, $Z_3$ and $Z_4$ each represents a hydrogen atom or —SO$_3$M wherein M represents an alkali metal atom or an organic amine residue, at least one of $Z_1$, $Z_2$, $Z_3$ and $Z_4$ is —SO$_3$M; and $l_1$, $l_2$, $l_3$, $l_4$, $m_1$, $m_2$, $m_3$, $m_4$, $m_5$ and $m_6$ are a positive integer satisfying the following relationship:

$$1 < l_1 + l_2 + l_3 + nl_4 < 100$$

and $$1 < m_1 + (m_2 \text{ or } m_5) + (m_3 \text{ or } m_6) + nm_4 < 150$$

1 Claim, No Drawings

SULFATE ESTERS OF POLYALKOXY ADDUCTS OF ETHYLENEDIAMINE

The present invention relates to a surface active compound useful for level dyeing hydrophobic synthetic fibers with a water-insoluble dye such as a disperse dye. More particularly, the present invention relates to a sulfo-polyoxyethylene polyoxyalkylene amine compound which is obtained by sulfonating a polyoxyethylene polyoxyalkylene amine compound prepared by adding alkylene oxides to an amine compound and, thereafter, adding ethylene oxides.

The practice has recently increased of dyeing hydrophobic synthetic fibers, such as polyester fibers, polyether polyester fibers, polyamide fibers, polyacrylic fibers, polyolefin fibers, and di- and tri-acetate fibers, with dyes which are insoluble or very slightly soluble in water. In this dyeing, dispersing agents for level dyeing are very important in order to uniformly or level dye the textile materials comprised of the hydrophobic synthetic fibers. This is because the use of the water-insoluble or slightly water-soluble dyes often cause various problems based on the dispersing property of these dyes.

The term "water-insoluble or slightly water-soluble dye" used herein includes disperse dye and the like. It refers to anthraquinone dye, azoic dye, naphthoquinone dye, nitro dye, methine dye, etc.

The dyeing of the hydrophobic synthetic fibers with disperse dyes is effected at a temperature higher than 70°C under suitable pressure conditions. It is known that such dyeing condition sometimes causes the dispersing property of the dye to be reduced. Consequently, speck-like deposits appear on the dyed fibers, or tar-like precipitation adheres to the inner surface of the dyeing machine. These phenomena are very disadvantageous in the dyeing of this kind and result in non-uniformity of the shade of color such as dyeing specks and the like.

The disperse dyes may be used alone or in a mixture thereof. It is also known that, in the case where the mixture is used, speck-like or tar-like precipitation tends to be formed during the dyeing process and the dyed fibers are non-uniformly colored. This is owing to the difference between dispersing agents contained in the dyes, the constructions or particle sizes of the dyes.

The hydrophobic synthetic fibers may be dyed in the form of various fiber articles such as loose stock of cut fibers, yarn, and woven, knitted and non-woven fabrics. In order to uniformly dye the fiber article, it is necessary that the disperse dye is finely dispersed in the dyeing liquor and the dye dispersion uniformly penetrates into the fiber article. During textile processing, oiling agents such as mineral oil and vegetable oil, and sizing agents such as starch and polyvinyl alcohol, are applied to the hydrophobic synthetic fibers. Although these agents are eliminated by scouring before dyeing, sometimes they still remain on the fiber article and result in reduction of the dispersing property of the dye.

Recent developments in dyeing machines are remarkable, and various types of machines have been used pertinent to the form of the fiber article. Either a dyebath is circulated through the fiber article, or the fiber article is moved in the dyebath. Under these circumstances, the circulation or agitation of the dyebath is speeded up and, therefore, the dispersion is required to be more stable.

The hydrophobic synthetic fibers, especially the polyester fibers, are generally dyed at a high temperature under a high pressure. A high stability of the dye dispersion is needed under the high temperature and high pressure conditions. It is known that some dyes are unstable under such conditions, so that the dispersed fine particles of dye coalesce to form numerous large masses. Such aggregation results in staining of the fiber article and/or in adhesion to the inner surface of the dyeing machine by precipitation of the aggregated dye particles. If aggregated masses of the dye particles have formed during the dyeing process, it is very difficult to redisperse the particles into the dyeing liquor.

Also, it is known that the oligomer having lower molecular weight comes out into the dyebath during the high temperature and high pressure process of dyeing the polyester fibers. This makes the dye dispersion unstable.

Further, it is known that the dye dispersion containing carriers such as chlorobenzenes, phenylphenols, methylnaphthalenes and diphenyls, is unstable. This is due to the interaction between the dye and the carrier, and often results in so-called carrier spotting or dyeing specks.

The above-mentioned problems are for the most part based on the instability of the dispersing property of the dye contained in the dyebath. Therefore, in the dyeing of the hydrophobic synthetic fibers, it is important that the dye is stable and finely dispersed in the dyeing liquor so that the dispersed dye particles can easily diffuse uniformly into the fiber article. In order to overcome these problems, dispersing agents are generally added into the dyebath. For this purpose, alkylbenzene sulfonates, formaldehyde condensates of naphthalene sulfonates, and polyoxyethylene alkyl ethers, polyoxyethylene alkylphenyl ethers and their sulfonates, fatty acid esters of polyoxyethylene glycol and the like, have been used alone, or in mixtures thereof. However, these are insufficient for this purpose and more effective dispersing agents are still desired.

An object of the present invention is to provide a dispersing agent useful for level dyeing hydrophobic synthetic fibers with the water-insoluble or slightly water-soluble dyes and for overcoming the above-mentioned problems.

The object of the present invention can be accomplished by using a surface active compound such as disclosed hereinafter. The surface active compound of the present invention is a sulfopolyoxyethylene polyoxyalkylene amine compound which is obtained by sulfonating a polyoxyethylene polyoxyalkylene amine compound. This compound is prepared by adding alkylene oxides to an amine compound having at least one primary and/or secondary amino group and, thereafter, adding ethylene oxides. It has been found that the sulfo-polyoxyethylene polyoxyalkylene amine compound has an excellent dispersing and level dyeing effect when it is added into the dyebath for the dyeing of the hydrophobic synthetic fibers with the water-insoluble or slightly water-soluble dyes.

The surface active compound for level dyeing of the present invention is the novel compound of the following formula (I):

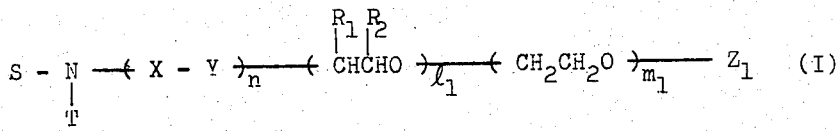

wherein S represents an alkyl group having 1 to 22 carbon atoms,

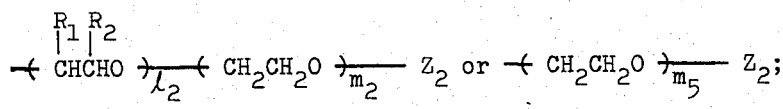

T represents an alkyl group having 1 to 22 carbon atoms,

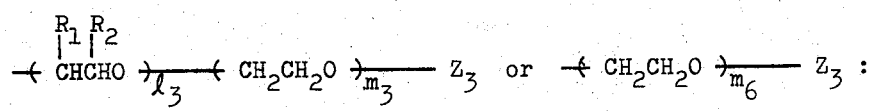

$n$ is an integer of 0 to 4; X represents an alkylene group having 2 to 6 carbon atoms; Y represents —O— or

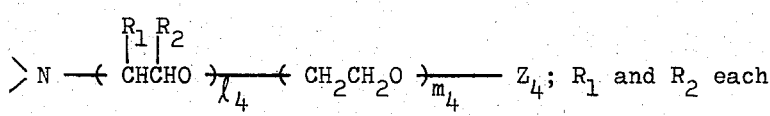

represents a hydrogen atom or an alkyl group having 1 to 22 carbon atoms but one of $R_1$ and $R_2$ should be the alkyl group if the other is the hydrogen atom; $Z_1$, $Z_2$, $Z_3$ and $Z_4$ each represents a hydrogen atom or —SO$_3$M wherein M represents an alkali metal atom or an organic amine residue, at least one of $Z_1$, $Z_2$, $Z_3$ and $Z_4$ is —SO$_3$M; and $l_1$, $l_2$, $l_3$, $l_4$, $m_1$, $m_2$, $m_3$, $m_4$, $m_5$ and $m_6$ are a positive integer satisfying the following relationship:

$$1 < l_1 + l_2 + l_3 + nl_4 + n < 100$$

and $$1 < m_1 + (m_2 \text{ or } m_5) + (m_3 \text{ or } m_6) + nm_4 < 150$$

Amine compounds usable for the present invention, having at least one of primary and/or secondary amino group, include: ethylamine, butylamine, octylamine, laurylamine and stearylamine; diethylamine, dibutylamine, dioctylamine, dilaurylamine and distearylamine; ethanolamine, diethanolamine, isopropanolamine, diisopropanolamine, ethylenediamine and diethylenetriamine; triethylenetetramine, tetraethylenepentamine, propylenediamine, tetramethylenediamine and hexamethylenediamine; N-dodecylpropylenedioamine, N-octadecylpropylenediamine and the like, preferably polyamine compounds such as ethylenediamine, diethylenetriamine, etc.

Alkylene oxides usable for the present invention include propylene oxide, butylene oxide and α-olefin oxides having 12 to 22 carbon atoms.

The sulfo-polyoxyethylene polyoxyalkylene amine compounds useful for the dispersing agent for level dyeing of the present invention are prepared by the following process.

Polyoxyalkylene amine compounds (II) are prepared by addition to an amine compound with an alkylene oxide. The addition is effected by reacting the equivalent mole or more of the alkylene oxide, based on the mole of the active hydrogen of the primary and/or secondary amino group contained in the amine compound, according to the reactive formula:

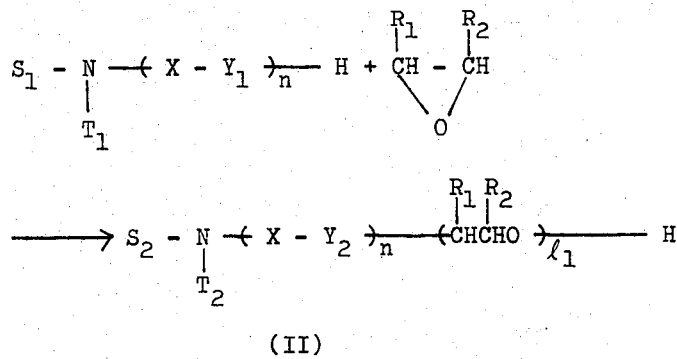

wherein X, $R_1$, $R_2$ and n are as defined above; $S_1$ and $T_1$ each representes a hydrogen atom, an alkyl group having 1 to 22 carbon atoms or $+CH_2Ch_2O+H$; $Y_1$ represents —O— or —NH—; $S_2$ represents an alkyl group having 1 to 22 carbon atoms,

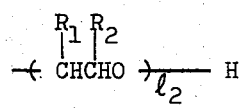

or $+CH_2CH_2O+H$; $T_2$ represents an alkyl group having 1 to 22 carbon atoms,

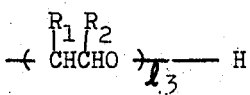

or $-(CH_2CH_2O)-H$, and; $Y_2$ represents $-O-$ or

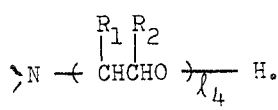

The reaction may be carried out at a temperature of from 40° to 190°C, in the presence or absence of water, polar solvent such as isopropanol, aromatic solvents such as benzene and toluene, or halogenated solvents such as chlorobenzene, trichloroethylene and perchloroethylene, with or without an alkaline catalyst such as sodium hydroxide and potassium hydroxide. When the polyoxyalkylene amine compound is prepared in the presence of the solvent, the solvent may be eliminated by heat condensation. In the above definition, $l_1 + l_2 + l_3 + nl_4$ is an integer of from 1 to 100, preferably from 2 to 80.

Polyoxyethylene polyoxyalkylene amine compounds (III) are prepared by reaction of the resultant polyoxyalkylene amine compound (II) with ethylene oxide. The reaction is effected by addition to the hydroxide end-group of the polyoxyalkylene amine compound with the ethylene oxide, according to the reaction formula:

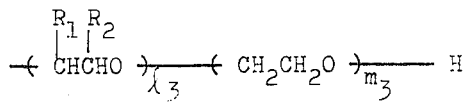

or $-(CH_2CH_2O)_{m_6} H$ and $Y_3$ represents $-O-$ or

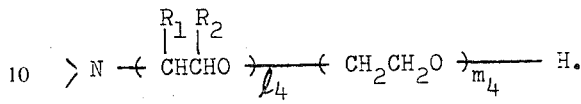

The addition may be carried out at a temperature of from 100° to 200°C, preferably from 150° to 190°C, in the presence of an acidic or alkaline catalyst. Preferably, it is carried out in the presence of sodium hydroxide or potassium hydroxide. In the above definition, $m_1 + (m_2$ or $m_5) + (m_3$ or $m_6) + nm_4$ is an integer of from 1 to 150, preferably from 10 to 100.

The resultant polyoxyethylene polyoxyalkylene amine compound (III) is then treated with a conventional sulfonating reagent such as chlorosulfonic acid, concentrated sulfuric acid, and sulfamic acid so as to sulfonate the hydroxide endgroup. Subsequently, the sulfonated amine compound is neutralized by treating it with an aqueous solution of sodium hydroxide or po-

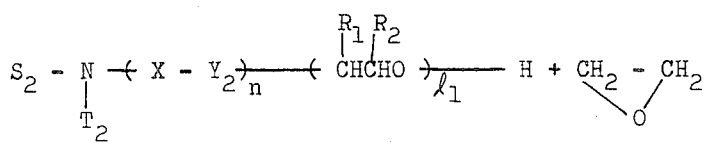

(II)

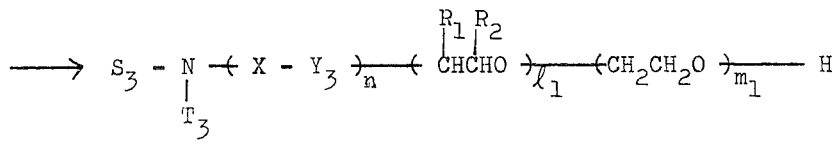

(III)

wherein $S_2$, $T_2$, X, $Y_2$, $R_1$, $R_2$, n, $l_1$, $l_2$, $l_3$ and $l_4$ are as defined above; $S_3$ represents an alkyl group having 1 to 22 carbon atoms,

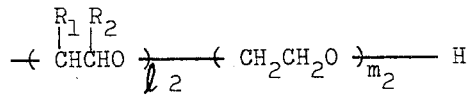

or $-(CH_2CH_2O)_{m_5} H$, and; $T_3$ represents an alkyl group having 1 to 22 carbon atoms, tassium hydroxide, or of an organic amine such as ethanolamine, diethanolamine, triethanolamine, isopropanolamine, triethylamine, butylamine, dibutylamine and tributylamine. The sulfonation is generally carried out at a temperature of from 0° to 170°C. However, it is preferable to carry it out at a temperature of from 0° to 30°C with chlorosulfonic acid, eliminating the hydrochloric gas formed during the reaction under a reduced pressure. The neutralization is carried out at a temperature of from 0° to 60°C. These reactions may be, for example, effected according to the reaction formula:

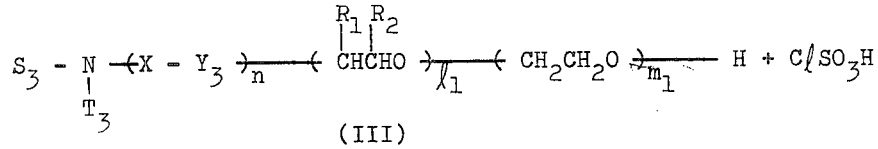

(III)

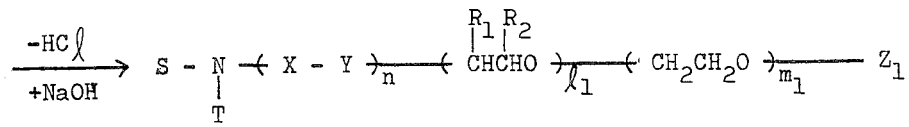

(I)

Thus, the desired sulfo-polyoxyethylene polyoxyalkylene amine compounds (I) are obtained.

The resultant sulfo-polyoxyethylene polyoxyalkylene amine compounds are highly soluble in water and valuable as a level dyeing agent for the water-insoluble dyes and the slightly water-soluble dyes such as disperse dyes. The dispersing, level dyeing agent of the present invention is very effective for retaining the water-insoluble dyes and the slightly water-soluble dyes in very fine dispersed particle form even when they are exposed to high temperature and high pressure for a long time.

The mechanisms of the dispersing, level dyeing activity of the compound according to the present invention are not evident theoretically. However, it can be described that the unexpected dispersing, level dyeing effect is assumed depending on the balance maintained among: the amino group, the hydrophobic polyoxyalkylene group, and the hydrophilic polyoxyethylene and sulfonic groups in the molecule of the compound, and on the voluminous construction thereof.

The water-insoluble or slightly water-soluble dyes to which the surface active compound of the present invention may be applied include anthraquinone dyes, azoic dyes, naphthoquinone dyes, nitro dyes, methine dyes and other dyes.

When the hydrophobic synthetic fibers are dyed with the water-insoluble or slightly water-soluble dye dispersed in an aqueous dyebath, the surface active compound of the present invention is dissolved in the dyebath in an amount of 30 to 500 percent based on the weight of the dye used. The surface active compound may be dissolved in the dyebath together with other dispersing agents such as: alkylbenzene sulfonates, formaldehyde condensates of naphthalene sulfonates, and polyoxyethylene alkyl ethers; polyoxyethylene alkyphenyl ethers and their sulfonates, fatty acid esters of polyoxyethylene glycol and the like.

The surface active compound of the present invention is valuable for level dyeing the hydrophobic synthetic fibers, for example, polyester fibers, polyether polyester fibers, polyamide fibers, polyacrylic fibers, polyolefin fibers, and di- and tri-acetate fibers, with dyes insoluble or slightly soluble in water.

The following examples are intended to illustrate the present invention but are not intended to limit the scope thereof.

EXAMPLE 1

61 parts by weight of ethanolamine and 540 parts by weight of α-olefin oxide (16 to 18 carbon atoms, average molecular weight of 270) were introduced into a glass flask equipped with thermometer, cooler, agitator, introducer for nitrogen gas and blower and reacted at a temperature of from 160° to 165°C for 5 hours. An intermediate product having a total amine value of 93.0 (theoretical value, 93.2) and a tertiary amine value of 92.9 (theoretical value, 93.2) was obtained. To the intermediate product 6 parts by weight of potassium hydroxide powder were added. Then 1320 parts by weight of ethylene oxide were blown in an atmosphere of nitrogen at a temperature of from 180° to 200°C to complete the reaction in the period of 9 hours. The intermediate product thus obtained had an average molecular weight of 1910 calculated from its hydroxyl value of 88.0 (theoretical value, 87.6). 90.5 parts by weight of the intermediate product were dissolved into 100 parts by weight of chloroform, and 11.7 parts by weight of chlorosulfonic acid were dropped into the solution at a temperature below 20°C in the period of 30 minutes. Then, the mixture was maintained room temperature under a reduced pressure for 30 minutes to eliminate hydrochloric acid. It was then neutralized with an aqueous solution of sodium hydroxide, and finally, chloroform was eliminated under a reduced pressure. The sulfuric acid incorporated into the resultant product, in 50 percent aqueous solution thereof, was 3.5 percent (theoretical value, 3.7%).

The resultant product was of the formula:

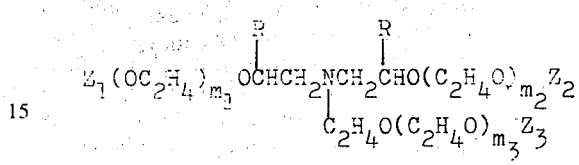

wherein R is an alkyl group having 14 to 16 carbon atoms and $m_1 + m_2 + m_3 = 30$, and; from the above value of the incorporated sulfuric acid it was ascertained that at least two of $Z_1$, $Z_2$ and $Z_3$ were $-SO_3Na$.

EXAMPLE 2

As described in Example 1, 270 parts by weight of stearylamine, and 540 parts by weight of α-olefin oxide (16 to 18 carbon atoms, average molecular weight of 270) were reacted at a temperature of from 160° to 170°C for 7 hours. An intermediate product having a total amine value of 69.0 (theoretical value, 69.2) and a tertiary amine value of 68.5 (theoretical value, 69.2) was obtained. To the intermediate product 4 parts by weight of potassium hydroxide powder were added and then 1760 parts by weight of ethylene oxide were blown in an atmosphere of nitrogen at a temperature of from 190° to 200°C to complete the reaction in the period of 9 hours. The intermediate product thus obtained had an average molecular weight of 2400, calculated from its hydroxyl value of 40.0 (theoretical value, 43.7). 120 parts by weight of the intermediate product were dissolved into 110 parts by weight of chloroform and 11.7 parts by weight of chlorosulfonic acid were dropped into the solution at a temperature below 25°C in the period of 30 minutes. Then, the mixture was treated at the room temperature under a reduced pressure for 40 minutes to eliminate hydrochloric acid. It was then neutralized with an aqueous solution of sodium hydroxide, and finally, chloroform was eliminated under a reduced pressure. The sulfuric acid incorporated into the resultant product, in 50 percent aqueous solution thereof, was 2.9 percent (theoretical value, 3.1%).

The resultant product was of the formula:

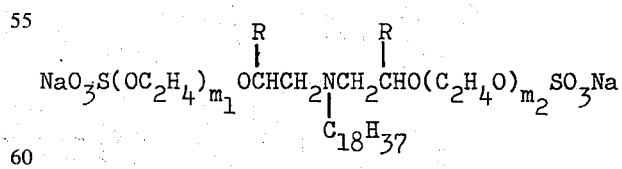

wherein R is as defined above and $m_1 + m_2 = 40$.

EXAMPLE 3

As described in Example 1, 24 parts by weight of N-dodecylpropylenediamine and 17.5 parts by weight of propylene oxide were reacted at 100° to 120°C for 3 hours. An intermediate product having a total amine value of 271 (theoretical value, 270) and a tertiary amine value of 268 (theoretical value, 270) was obtained. To the intermediate product 2 parts by weight of potassium hydroxide powder were added, and then 133 parts by weight of ethylene oxide were blown at 180° to 200°C to complete the reaction in the period of 8 hours. The intermediate product thus obtained had an average molecular weight of 1750 based on its hydroxyl value. 87.5 parts by weight of the intermediate product were dissolved into 90 parts by weight of chloroform and then 3.9 parts by weight of chlorosulfonic acid were dropped into the solution at a temperature below 25°C in the period of 30 minutes. Then, the mixture was treated for 40 minutes to eliminate hydrochloric acid and then neutralized with butylamine and finally, chloroform was eliminated. The sulfuric acid incorporated into the resultant product, in 50 percent aqueous solution thereof, was 1.9 percent (theoretical value, 2.1%).

The resultant product was of the formula:

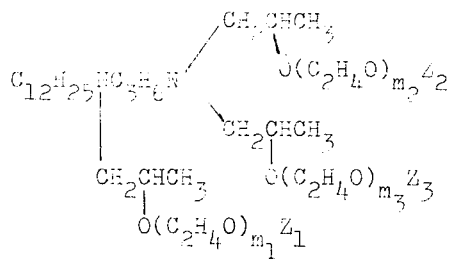

wherein $m_1 + m_2 + m_3 = 30$ and at least one of $Z_1$, $Z_2$ and $Z_3$ is $-SO_3^- \cdot {}^+NH_3C_4H_9$.

EXAMPLE 4

As described in Example 1, 30 parts by weight of ethylenediamine and 540 parts by weight of α-olefin oxide (16 to 18 carbon atoms, average molecular weight of 270) were reacted at 100° to 160°C for 6 hours. An intermediate product having a total amine value of 98.1 (theoretical value, 98.4) and a tertiary amine value of 97.9 (theoretical value, 98.4) was obtained. To the intermediate product 4 parts by weight of sodium hydroxide were added and then 704 parts by weight of ethylene oxide were blown at 170° to 190°C to complete the reaction in the period of 8 hours. The intermediate product thus obtained had an average molecular weight of 2550 based on its hydroxyl value. 127.5 parts by weight of the intermediate product were dissolved into 140 parts by weight of chloroform and then 25 parts by weight of chlorosulfonic acid were dropped into the solution at a temperature below 20°C in the period of 30 minutes. Then, the mixture was treated for one hour to eliminate hydrochloric acid and then neutralized with butylamine and finally, chloroform was eliminated. The sulfuric acid incorporated into the resultant product, in 50 percent aqueous solution thereof, was 4.9 percent (theoretical value, 5.1%).

The resultant product was of the formula:

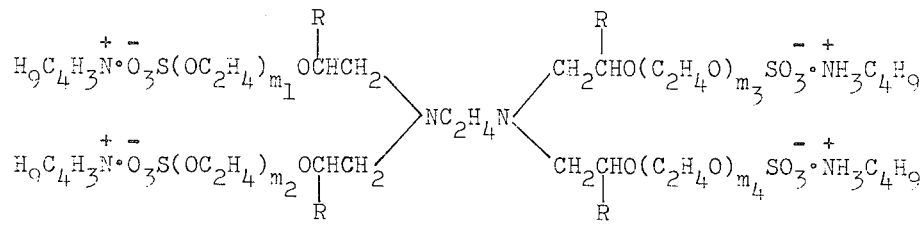

wherein R is as defined above and $m_1 + m_2 + m_3 + m_4 = 32$.

EXAMPLE 5

As described in Example, 3, 30 parts by weight of ethylenediamine and 290 parts by weight of propylene oxide were reacted. Tetra-polyoxypropylene ethylenediamine having a total amine value of 174 (theoretical value, 175) and a tertiary amine value of 170 (theoretical value, 175) was obtained. To the tetra-polyoxypropylene ethylenediamine 2 parts by weight of potassium hydroxide were added and then 1320 parts by weight of ethylene oxide were blown at 190° to 200°C. The intermediate product thus obtained had an average molecular weight of 3300 based on its hydroxyl value. 11 parts by weight of chlorosulfonic acid were dropped into 66 parts by weight of the intermediate product at a temperature of from 20° to 35°C and then hydrochloric acid was eliminated in the period of 1 hour. Then, the mixture was neutralized with aqueous solution of sodium hydroxide. The sulfuric acid incorporated into the product, in 50 percent aqueous solution thereof, was 4.0 percent (theoretical value, 4.3%).

The resultant product was of the formula:

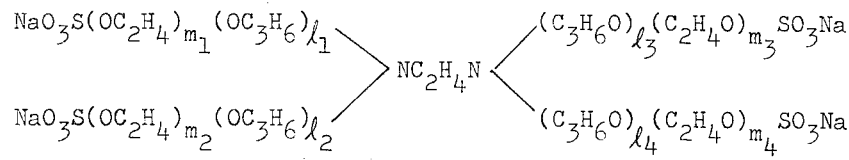

wherein $l_1 + l_2 + l_3 + l_4 = 10$ and $m_1 + m_2 + m_3 + m_4 = 60$.

EXAMPLE 6

66 parts by weight of tetra-polyoxyethylene polyoxypropylene ethylenediamine, as obtained in Example 5, were sulfonated with 5 parts by weight of chlorosulfonic acid and then neutralized with sodium hydroxide. The sulfuric acid incorporated into the product, in 50 percent aqueous solution thereof, was 2.1 percent (theoretical value, 2.3%).

The resultant product was of the formula:

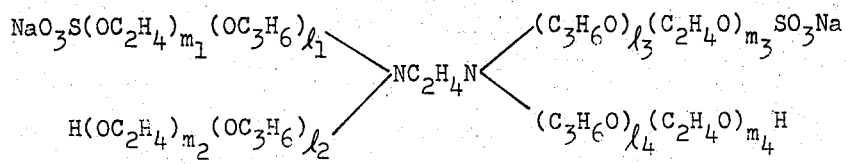

wherein $l_1 + l_2 + l_3 + l_4 = 10$ and $m_1 + m_2 + m_3 + m_4 = 60$.

EXAMPLE 7

As described in Example 3, 58 parts by weight of hexamethylenediamine and 232 parts by weight of propylene oxide were reacted. An intermediate product having an average molecular weight of 540 was obtained. To the intermediate product 4 parts by weight of sodium hydroxide were added and then 880 parts by weight of ethylene oxide were blown at 180° to 190°C. The intermediate product thus obtained had an average molecular weight of 2250 based on its hydroxyl value. 45 parts by weight of the intermediate product were dissolved into 50 parts by weight of chloroform and then sulfonated with 5 parts by weight of chlorosulfonic acid. Then, the mixture was neutralized with diethanolamine and finally, chloroform was eliminated. The sulfuric acid incorporated into the resultant product, in 50 percent aqueous solution thereof, was 3.2 percent (theoretical value, 3.1%).

The resultant product was of the formula:

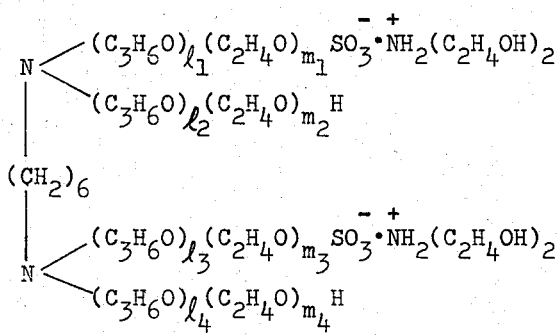

wherein $l_1 + l_2 + l_3 + l_4 = 8$ and $m_1 + m_2 + m_3 + m_4 = 40$.

EXAMPLE 8

A scoured fabric consisting of cellulose diacetate was dyed in the dyebath containing the following composition at a temperature of 70°C for 1 hour.

| Dye Composition | |
|---|---|
| 2% o.w.f. | C.I. Disperse Blue 3 |
| 1 g/l | 50% aqueous solution of the product obtained in Example 1 |
| 1% o.w.f. | Acetic acid (40%) |
| Liquor ratio: | 1 : 30 |

The dyeing was carried out without depositing the dye onto the fabric or the inner surface of the dye vessel. The resultant fabric had uniform quality in clear blue color and an excellent rubbing fastness in class 5.

For comparison, the same dyeing procedure was repeated without introducing the product of Example 1 into the dyebath. The dyed fabric was inferior to the above fabric in the rubbing fastness.

EXAMPLE 9

A scoured polyamide filament yarn fabric was dyed in the dyebath containing the following composition at a temperature of 95°C for 50 minutes.

| Dye Composition | |
|---|---|
| 2% o.w.f. | C.I. Disperse Yellow 42 |
| 2% o.w.f. | 50% aqueous solution of the product obtained in Example 2 |
| Liquor ratio: | 1 : 20 |

The dyeing was carried out without depositing the dye onto the fabric or the inner surface of the dyeing vessel. The resultant fabric had uniform quality in clear yellow color.

For comparison, the same dyeing procedure was repeated without introducing the product of Example 2 into the dyebath. Staining of dye precipitation was observed on the dyed fabric.

EXAMPLE 10

100 g of scoured cellulose triacetate fabric was dyed in the following dyebath at the boiling temperature for 70 minutes:

| | |
|---|---|
| C.I. Disperse Orange 13 | 2 g |
| The product of Example 3 | 5 g |
| Water | 3000 ml |

The dyeing was carried out without depositing the dye onto the fabric or the inner surface of the dyeing vessel. The resultant fabric had uniform quality and an excellent rubbing fastness in class 5.

For comparison, the same dyeing procedure was repeated without using the product of Example 3. The dyed fabric was stained by dye precipitation and inferior to the above fabric in rubbing fastness.

EXAMPLE 11

A polyethylene terephthalate textured yarn fabric was charged into a closed dyeing machine and dyed in the dyebath containing the following composition at a temperature of 130°C for 70 minutes.

| Dye Composition | |
|---|---|
| 3% o.w.f. | C.I. Disperse Orange 13 |
| 3% o.w.f. | The product of Example 4 |
| 1% o.w.f. | Acetic acid (48%) |
| Liquor ratio: | 1 : 40 |

The dyeing was carried out without depositing the dye onto the fabric or the inner surface of the dyeing machine. The resultant fabric had uniform quality.

For comparison, the same dyeing procedure was repeated without using the product of Example 4. After the comparison dyeing was completed, it was observed that the dyed fabric and the inner surface of the dyeing machine were stained by dye precipitation.

EXAMPLE 12

A polyethylene terephthalate textured yarn fabric was charged into a closed dyeing machine and dyed in the dyebath containing the following composition at a temperature of 120° to 125°C for 50 minutes.

| Dye Composition | |
| --- | --- |
| 5% o.w.f. | C.I. Disperse Blue 71 |
| 4% o.w.f. | The product of Example 5 |
| 0.5% o.w.f. | Acetic acid (48%) |
| Liquor ratio: | 1 : 30 |

The dyeing was carried out without depositing the dye onto the fabric or the inner surface of the dyeing machine. The resultant fabric had uniform quality in clear blue color and an excellent rubbing fastness in class 5.

For comparison, the same dyeing procedure was repeated without using the product of Example 5. The dyed fabric was stained by dye precipitation and inferior to the above fabric in rubbing fastness.

EXAMPLE 13

A blend yarn containing polyethylene terephthalate and cotton was introduced into a closed dyebath-circulating type dyeing machine and dyed in the dyebath containing the following composition at a temperature of 130°C for 60 minutes.

| Dye Composition | |
| --- | --- |
| 1% o.w.f. | C.I. Disperse Yellow 42 |
| 2% o.w.f. | The product of Example 6 |
| 0.5% o.w.f. | Acetic acid (90%) |

The dyeing was carried out without depositing the dye onto the yarn or the inner surface of the dyeing machine. The resultant yarn had uniform quality.

A control yarn was dyed by the same procedure without using the product of Example 6. The dyed yarn was stained by the dye precipitation.

EXAMPLE 14

A polyethylene terephthalate fabric was dyed in the dyebath containing the following composition at 95°C for 70 minutes.

| Dye Composition | |
| --- | --- |
| 2% o.w.f. | C.I. Disperse Blue 3 |
| 3% o.w.f. | The product of Example 7 |
| 8% o.w.f. | Carrier No. 51 (Nikka Chemical Industrial Co., Ltd., chlorobenzene type carrier) |
| Liquor ratio: | 1 : 25 |

The resultant fabric had no carrier spotting or dyeing speck but uniform quality.

A control fabric was dyed by the same procedure without using the product of Example 7. The dyed fabric was stained by dye precipitation.

What we claim is:

1. A surface-active compound produced by reacting ethylene diamine and propylene oxide at a temperature of 100° to 120°C, to obtain a reaction product comprising tetra-polyoxypropylene ethylene diamine, treating said diamine with potassium hydroxide and adding thereto ethylene oxide at a temperature of about 190° to 200°C to obtain an intermediate product, sulfonating said intermediate product with chlorosulfonic acid at a temperature ranging between about 20° and 35°C, and neutralizing the reaction mixture with aqueous sodium hydroxide to obtain the desired surface-active compound having 10 oxypropylene groups and 60 oxyethylene groups.

* * * * *